United States Patent
Kim et al.

(10) Patent No.: US 7,622,220 B2
(45) Date of Patent: Nov. 24, 2009

(54) POLYMER ELECTROLYTE AND FUEL CELL USING THE SAME

(75) Inventors: Hae-kyoung Kim, Seoul (KR); Kenneth J. Balkus, Jr., The Colony, TX (US); Hyuk Chang, Seongnam-si (KR); John Patrick Ferraris, Coppell, TX (US); Duck Joo Yang, Flower Mound, TX (US); Zhiwei Yang, Richardson, TX (US)

(73) Assignees: Samsung SDI Co., Ltd., Suwon (KR); The University of Texas System Board of Regents, Austin, TX (US)

( * ) Notice: Subject to any disclaimer, the term of this patent is extended or adjusted under 35 U.S.C. 154(b) by 642 days.

(21) Appl. No.: 11/332,266

(22) Filed: Jan. 17, 2006

(65) Prior Publication Data

US 2006/0159975 A1 Jul. 20, 2006

Related U.S. Application Data

(60) Provisional application No. 60/644,019, filed on Jan. 18, 2005.

(30) Foreign Application Priority Data

Feb. 12, 2005 (KR) .................... 10-2005-0011738

(51) Int. Cl.
*H01M 6/18* (2006.01)
(52) U.S. Cl. .................. 429/188; 429/189; 429/302; 429/303; 205/420; 524/414; 524/442; 525/474; 525/540

(58) Field of Classification Search .................. None
See application file for complete search history.

(56) References Cited

U.S. PATENT DOCUMENTS

| 4,560,444 A | * | 12/1985 | Polak et al. ................. 205/783 |
| 5,688,614 A |   | 11/1997 | Li et al. |
| 5,723,231 A |   | 3/1998 | Wu et al. |

FOREIGN PATENT DOCUMENTS

| JP | 62-76457 A | * | 4/1987 |
| JP | 05-320542 |   | 12/1993 |
| JP | 2003-96391 A | * | 4/2003 |
| JP | 2004-047232 |   | 2/2004 |
| JP | 2004-186120 |   | 7/2004 |
| JP | 2004-342593 |   | 12/2004 |

OTHER PUBLICATIONS

Abstract for an article entitled, "Synthesis and Properties of new Macromolecule/Heteropolyacid Charge Transfer Complexes" authored by Lin et al. and published in Gongneng Gaofenzi Xuebao (2005), 18(2), 239-242.*

Article entitled "Fabrication and Evaluation of Inorganic-organic Composite Protonic Conductors using Inorganic Sols as a Dispersoid" authored by Nagai et al. and published in Solid State Ionics (2005), 176(39-40), 2991-2995.*

* cited by examiner

*Primary Examiner*—Marc S Zimmer
(74) *Attorney, Agent, or Firm*—H. C. Park & Associates, PLC

(57) ABSTRACT

A polymer electrolyte forming composition includes a trialkoxysilane containing an epoxy group, polyethyleneimine, and at least one of heteropolyacid and trifluoromethanesulfoneimide.

27 Claims, 2 Drawing Sheets

— SILICON POLYMER
— PEI
▲ HETEROPOLY ACID
● MESOPOROUS MATERIAL HAVING A FUNCTIONAL GROUP

POLYMER ELECTROLYTE AND FUEL CELL USING THE SAME

CROSS-REFERENCE TO RELATED PATENT APPLICATIONS

This application claims priority to and the benefit of U.S. Provisional Patent Application No. 60/644,019, filed on Jan. 18, 2005, and Korean Patent Application No. 10-2005-0011738, filed on Feb. 12, 2005, which are hereby incorporated by reference for all purposes as if fully set forth herein.

BACKGROUND OF THE INVENTION

1. Field of the Invention

The present invention relates to a polymer electrolyte and a fuel cell using the same, and more particularly, to a polymer electrolyte used to form a polymer electrolyte membrane that has excellent ionic conductivity at high temperatures and low humidity and reduces methanol crossover.

2. Discussion of the Background

Fuel cells are electrochemical devices that convert the chemical energy of hydrogen and oxygen into electricity. The hydrogen may be obtained from hydrocarbons, such as methanol, ethanol, and natural gas. The energy converting process used by fuel cells is substantially effective and environmentally friendly, and various types of fuel cells have been developed.

Fuel cells can be categorized according to the type of electrolyte used. Types of fuel cells include phosphoric acid fuel cells (PAFCs), molten carbonate fuel cells (MCFCs), solid oxide fuel cells (SOFCs), polymer electrolyte membrane fuel cells (PEMFCs), alkali fuel cells (AFCs), and the like. These fuel cells operate based on the same principle, but fuels, operating temperatures, catalysts, electrolytes, and the like may vary according to the type of fuel cell.

PEMFCs are particularly advantageous for use in small stationary electric generating equipment and transportation systems because they can operate at low temperatures, have a large output density, can be started quickly, and can quickly respond to changes in the required power output.

One important component of PEMFCs is a membrane electrode assembly (MEA). An MEA may includes a polymer electrolyte membrane and two electrodes respectively acting as a cathode and an anode, which are attached to both sides of the polymer electrolyte membrane.

The polymer electrolyte membrane may act as a separator to prevent direct contact between an oxidant and a reductant, an insulator to electrically insulate the two electrodes, and a proton conductor. To serve these purposes, the polymer electrolyte membrane properties may include high proton conductivity, excellent electrical insulating property, low permeability to reactants, excellent thermal, chemical, and mechanical stability under the fuel cell operating conditions, low manufacturing costs, and the like.

Various polymer electrolyte membranes have been developed in attempts to produce a polymer electrolyte membrane with the desired properties. Perfluoropolysulfonic acid films, such as films made of NAFION by DuPont, are widely used due to their durability and performance. However, perfluoropolysulfonic acid films must be sufficiently humidified for proper operation and must be used at 80° C. or lower to prevent the loss of humidity. Additionally, perfluoropolysulfonic acid films are unstable under fuel cell operating conditions because C—C bonds in its molecular backbone may be attacked by $O_2$.

Furthermore, in DMFCs, an aqueous methanol solution is supplied to the anode as fuel. A portion of the unreacted methanol may permeate into the polymer electrolyte membrane. The methanol permeating into the polymer electrolyte membrane may diffuse through and swell the polymer electrolyte membrane and then enter a cathode catalyst layer. This phenomenon is referred to as methanol crossover. The methanol is directly oxidized in the cathode where electrochemical reduction between hydrogen ions and oxygen occurs, thereby lowering a potential in the cathode and deteriorating the performance of the cell.

PEMFCs that can operate at temperatures of 100° C. or higher are desirable because the efficiency of a catalyst and the resistance of the catalyst against CO poisoning of the catalyst increases. In addition, a fuel cell that can operate at high temperatures and low humidity may not require peripheral devices to humidify the fuel cells. This may simplify the overall structures of the fuel cell systems.

Attempts at producing a PEMFCs that may be operated at high temperatures and low humidity have included a polymer membrane produced by fixing a solid, such as silicagel, zirconium phosphoric acid, or the like, therein. However, the improvement in performance of this type of polymer membrane is limited. A polymer membrane impregnated with an acid has been developed, but the polymer membrane suffers from a loss of the acid and corrosion over time. A membrane using an ionically non-conductive polymer in which an acid is distributed has been developed. However, in this membrane, a loss of acid and corrosion occur, and anions are adsorbed onto a catalyst. A method using $CsHSO_4$ as a solid acid or a solid acid salt has been tried, but the manufacturing process for this membrane is complex, and the mechanical properties of the membrane are unsatisfactory due to high solubility in water.

A need thus exists for a polymer electrolyte membrane that has satisfactory ionic conductivity and durability at high temperatures and low humidity.

SUMMARY OF THE INVENTION

The present invention provides a polymer electrolyte that has excellent ionic conductivity at high temperatures and low humidity and reduces methanol crossover.

The present invention also provides a method of manufacturing the polymer electrolyte.

The present invention also provides a fuel cell including the polymer electrolyte.

Additional features of the invention will be set forth in the description which follows, and in part will be apparent from the description, or may be learned by practice of the invention.

The present invention discloses a polymer electrolyte, including a product of the polymerization of a polymer electrolyte forming composition, where the polymer electrolyte forming composition includes a trialkoxysilane containing an epoxy group, polyethyleneimine, and at least one of heteropolyacid and trifluoromethanesulfoneimide.

The present invention also discloses a method of manufacturing a polymer is electrolyte, including preparing a polymer electrolyte forming composition by mixing polyethyleneimine, a trialkoxysilane containing an epoxy group, and at least one of heteropolyacid and trifluorosulfoneimide, and polymerizing the polymer electrolyte forming composition by heating.

The present invention also discloses a fuel cell, including a cathode, an anode, and a polymer electrolyte membrane interposed between the anode and the cathode, where the polymer electrolyte includes a product of the polymerization of a polymer electrolyte forming composition, where the polymer electrolyte forming composition includes a trialkoxysilane containing an epoxy group, polyethyleneimine, and at least one of heteropolyacid and trifluoromethanesulfoneimide.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
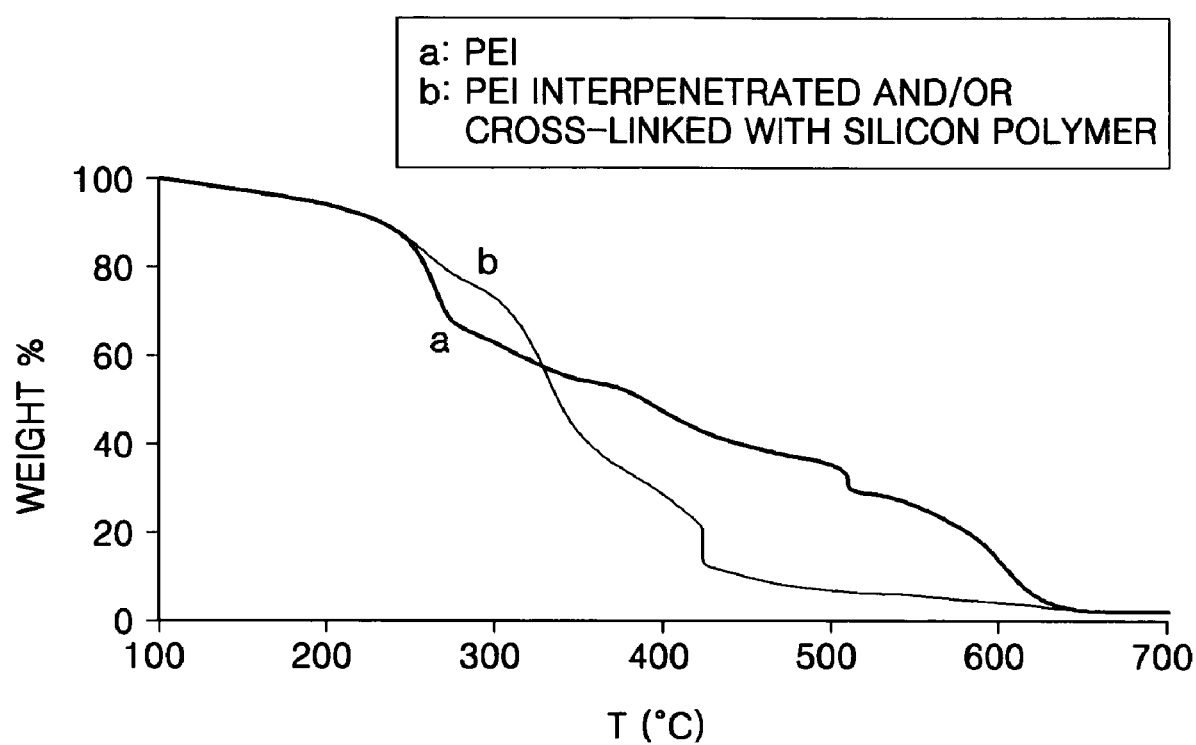
FIG. 1 is a graph of the results of a thermogravimetric analysis (TGA) on a polymer electrolyte membrane according to an exemplary embodiment of the present invention and a polyethyleneimine (PEI) polymer membrane.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element such as a layer, film, region or substrate is referred to as being "on" another element, it can be directly on the other element or intervening elements may also be present. In contrast, when an element is referred to as being "directly on" another element, there are no intervening elements present.

A Bronsted acid-base system, such as organic amine/trifluoromethanesulfoneimide (HTFSI), has good ionic conductivity at temperatures of about 100° C. to about 200° C. in zero or low humidity. The ionic conductivity is achieved because the Bronsted acid-base system complies with the Grotthuss mechanism in which protons are delivered through neighboring active sites of amine/acid groups. Because the activation energy for proton conduction depends on the distance of the neighboring amine/acid group, the distance between active sites can be reduced by increasing the density of functional groups to increase the ionic conductivity.

A polymer electrolyte forming composition according to an exemplary embodiment of the present invention may include a trialkoxysilane containing an epoxy group, polyethyleneimine (PEI), and at least one of heteropolyacid and HTFSI. A polymer electrolyte according to an exemplary embodiment of the present invention may be prepared by polymerizing the polymer electrolyte forming composition. The polymer electrolyte may include a silicon polymer, which is obtained through the hydrolysis condensation polymerization of the trialkoxysilane containing an epoxy group, and PEI; and/or a product of a cross-linking reaction of a trialkoxysilane containing an epoxy group and PEI; and at least one of heteropolyacid and HTFSI.

The amount of the trialkoxysilane containing an epoxy group in the polymer electrolyte forming composition may be in the range of about 10 to about 25 parts by weight per 100 parts by weight of the polymer electrolyte membrane forming composition. When the amount of the trialkoxysilane containing an epoxy group is greater than about 25 parts by weight, the ionic conductivity of the polymer electrolyte membrane may decrease. When the amount of the trialkoxysilane containing an epoxy group is less than about 10 parts by weight, the mechanical properties of the polymer electrolyte membrane may deteriorate.

The amount of the PEI may be in the range of about 60 to about 75 parts by weight per 100 parts by weight of the polymer electrolyte membrane forming composition. When the amount of the PEI is greater than about 75 parts by weight, the ionic conductivity of the polymer electrolyte membrane may decrease. When the amount of the PEI is less than about 60 parts by weight, the mechanical properties of the polymer electrolyte membrane may deteriorate.

PEI may be represented by Formula 1 below. PEI has the highest amine density among polyamine polymers.

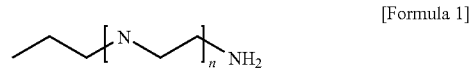

[Formula 1]

The PEI may be mixed with a silicon polymer obtained through the hydrolysis condensation polymerization of the trialkoxysilane containing an epoxy group. The PEI may be alternatively or additionally cross-linked with the trialkoxysilane containing an epoxy group.

The PEI and the silicon polymer mixture may have an interpenetrated structure. The term "interpenetration" refers to the state in which the PEI polymer chain is 3-dimensionally randomly entangled with the polymer chain of the silicon polymer. This structure seems to be uniform macroscopically, and thus concentration gradients do not appear to be present.

Any compound that includes silicon, an alkoxy group, and an epoxy ring and that can be polymerized may be used as the trialkoxysilane containing an epoxy group. The trialkoxysilane containing an epoxy group may be 3-glycidyloxypropyltrimethoxysilane represented by Formula 2 below.

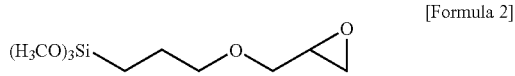

[Formula 2]

The 3-glycidyloxypropyltrimethoxysilane may be polymerized through the processes illustrated in Reaction Scheme 1 below.

Reaction Scheme 1

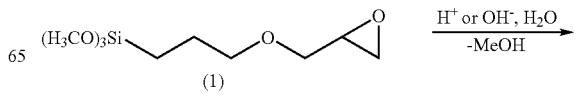

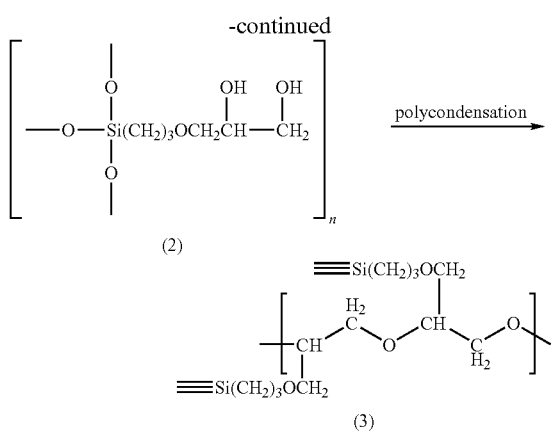

As illustrated in Reaction Scheme 1, the 3-glycidyloxypropyltrimethoxysilane undergoes hydrolysis condensation polymerization with the removal of methanol, resulting in a polymer (3) with a 3-dimensional network.

The interpenetrated mixture of PEI and silicon polymer, the product of the cross-linking reaction between the trialkoxysilane containing an epoxy group and the PEI, or a mixture of the two may effectively prevent methanol crossover when used in a polymer electrolyte. This effect may be attributed to the narrow intervals between the interpenetrated or cross-linked molecules. Additionally, the narrow molecular interval may improve ionic conductivity by preventing ionic conductive material, such as heteropolyacid or the like, from leaking out of the fuel cell.

The heat resistance of the polymer electrolyte may also be improved when the PEI polymer is interpenetrated and/or cross-linked with a silicon polymer, compared to when PEI polymer is used alone (see FIG. 1). FIG. 1 is a graph illustrating the results of a thermogravimetric analysis (TGA) on a PEI polymer, represented by line "a", and a PEI polymer interpenetrated and/or cross-linked with a silicon polymer, represented by line "b". As FIG. 1 shows, the heat resistance of "b" is greater than the heat resistance of "a" near 300° C.

The total amount of heteropolyacid and/or HTFSI may be in the range of about 3 to about 25 parts by weight per 100 parts by weight of the polymer electrolyte membrane forming composition. When the total amount of heteropolyacid and/or HTFSI is greater than about 25 parts by weight, the mechanical properties of the polymer electrolyte membrane may deteriorate and the polymer electrolyte membrane may become brittle. When the total amount of heteropolyacid and/or HTFSI is less than about 3 parts by weight, the ionic conductivity of the polymer electrolyte membrane may decrease.

The amount of the heteropolyacid in the total amount of heteropolyacid and/or HTFSI may be in the range of 0 to 100 parts by weight per 100 parts by weight of the total amount, and preferably about 30 to about 70 parts by weight. The amount of HTFSI in the total amount of heteropolyacid and/or HTFSI may be in the range of 0 to 100 parts by weight per 100 parts by weight of the total amount, and preferably about 30 to about 70 parts by weight.

The polymer electrolyte membrane forming composition according to an exemplary embodiment of the present invention may further contain a mesoporous material with a cation exchanging group. The total amount of heteropolyacid, mesoporous material with a cation exchanging group, and/or HTFSI may be in the range of about 3 to about 25 parts by weight per 100 parts by weight of the polymer electrolyte membrane forming composition. When the total amount of the heteropolyacid, the mesoporous material with a cation exchanging group and/or the HTFSI is less than about 3 parts by weight, the ionic conductivity of the polymer electrolyte may decrease. When the total amount of the heteropolyacid, the mesoporous material with a cation exchanging group and/or the HTFSI is more than about 25 parts by weight, the mechanical properties of a polymer electrolyte membrane may deteriorate and the polymer electrolyte membrane may become brittle.

The amount of the heteropolyacid in the total amount of the heteropolyacid, the mesoporous material with a cation exchanging group, and/or the HTFSI may be in the range of 0 to 100 parts by weight per 100 parts by weight of the total amount, and preferably about 20 to about 70 parts by weight. The amount of mesoporous material with a cation exchanging group in the total amount of the heteropolyacid, the mesoporous material with a cation exchanging group, and/or the HTFSI may be in the range of 0 to 100 parts by weight per 100 parts by weight of the total amount, and preferably about 3 to about 45 parts by weight. The amount of the HTFSI in the total amount of the heteropolyacid, the mesoporous material with a cation exchanging group, and/or the HTFSI may be in the range of 0 to 100 parts by weight per 100 parts by weight of the total amount, and preferably about 15 to about 55 parts by weight.

The polymer electrolyte membrane forming composition may further include an acid catalyst. The acid catalyst may be in a liquid or solid state. Any material with acidity can be used as the acid catalyst. The acid catalyst may be an nitric acid, a hydrochloric acid, a sulfuric acid, phosphoric acid, acetic acid, organic sulfonic acid, hydrofluoric acid, $CF_3SO_3H$, or the like.

Figure 2:
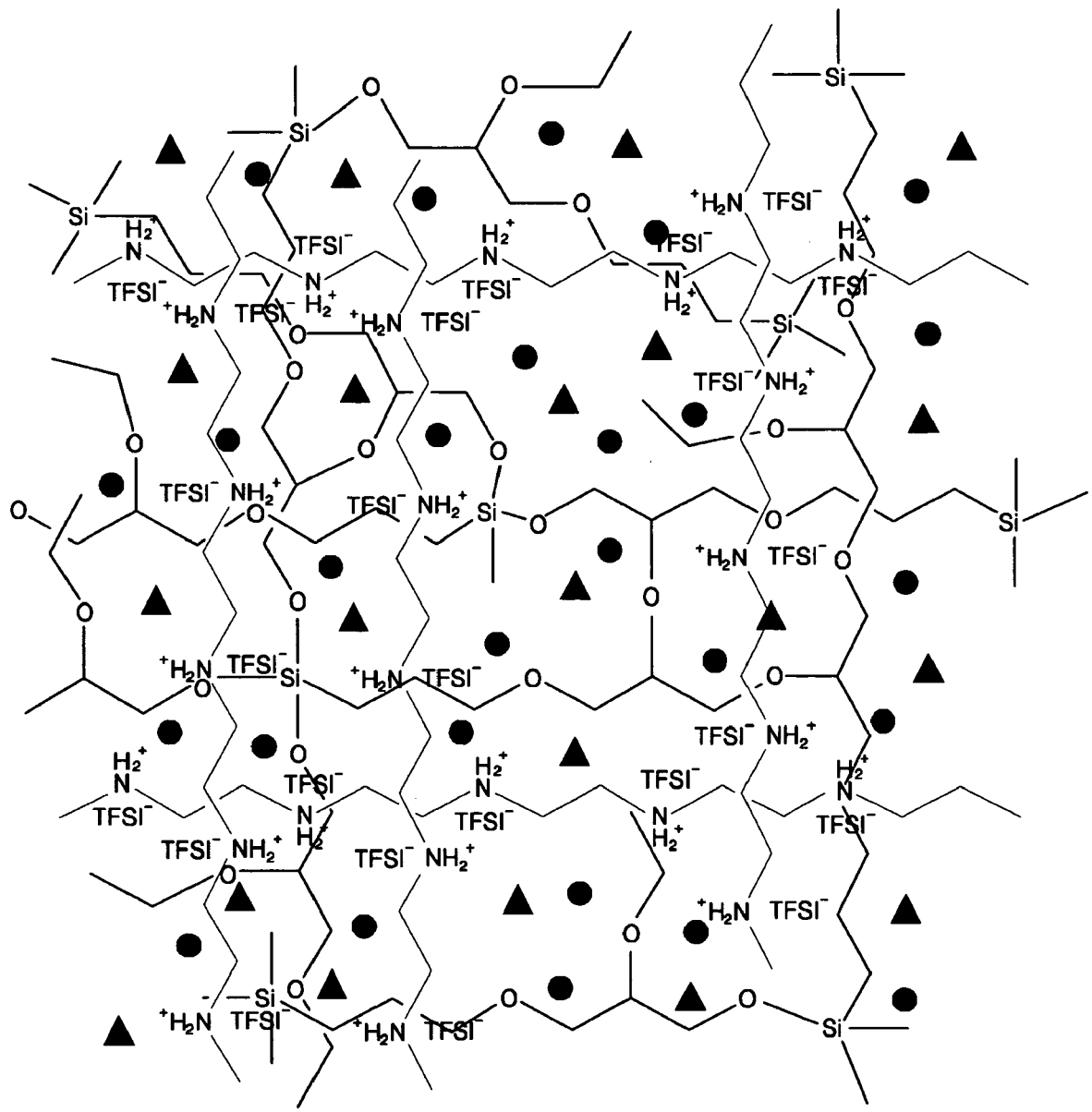
FIG. 2 is a schematic view illustrating the structure of a polymer electrolyte according to an exemplary embodiment of the present invention.

FIG. 2 is a schematic view illustrating the structure of the polymer electrolyte membrane forming composition according to the present invention. As shown in FIG. 2, the heteropolyacid, the mesoporous material with a cation exchanging group, and/or the HTFSI may be uniformly distributed in a mixture of the polyethyleneimine and the silicon polymer which are interpenetrated and/or cross-linked with each other. The heteropolyacid, the mesoporous material with a cation exchanging group, and/or the HTFSI may increase the ionic conductivity.

The heteropolyacid may have a center atom that is a metal or an equivalent to metal. The center atom may have a polyacid group of another metal coordinated with it. The central atom may be H, Cu, Be, B, Al, C, Si, Ge, Sn, Ti, Zr, Ce, Th, N, P, As, Sb, V, Nb, Ta, Cr, Mo, W, U, S, Se, Te, Mn, I, Fe, Co, Ni, Rh, Os, Ir, Pt, or the like. The polyacid group may be V, Mo, W, or the like. The heteropolyacid may be $H_4SiW_{12}O_{40}$, $H_4SiMo_{12}O_{40}$, $H_5SiVMo_{11}O_{40}$, $H_6SiV_2Mo_{10}O_{40}$, $H_7SiV_3Mo_9O_{40}$, $H_3PMo_{12}O_{40}$, $H_3PW_{12}O_{40}$, $(VO)_{1.5}PM_{12}O_{40}$, $(VO)_{1.5}PW_{12}O_{40}$, $(TiO)_{1.5}PMo_{12}O_{40}$, $H(VO)PMo_{12}O_{40}$, $H(VO)PW_{12}O_{40}$, $H_6PV_3Mo_9O_{40}$, $H_5PV_2Mo_{10}O_{40}$, $H_5PV_2W_{10}O_{40}$, $H_6PV_3W_9O_{40}$, $H_4PV_2Mo_{11}O_{40}$, $H_4PVW_{11}O_{40}$, $RhPMo_{12}O_{40}$, $BiPMo_{12}O_{40}$, $HCrPVMo_{11}O_{40}$, $HBiPVMo_{11}O_{40}$, a combination of these, or the like.

The mesoporous material with a cation exchanging group may be any material with an acidic functional group and a pore size of about 2 to about 50 nm. The mesoporous material with a cation exchanging group may be sulfonated silica, carboxylated silica, sulfonated tungstosilica, carboxylated tungstosilica, phosphonated silica, or phosphonated tungstosilica.

The HTFSI (Trifluoromethanesulfoneimide) used in the present invention may be represented by Formula 3 below.

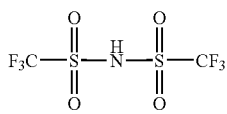

[Formula 3]

The polymer electrolyte membrane forming composition according to the present invention may be prepared as follows.

The polymer electrolyte membrane forming composition may be prepared by uniformly mixing PEI, a trialkoxysilane containing an epoxy group, and at least one of heteropolyacid and HTFSI, and then heating the resulting mixture. The trialkoxysilane containing an epoxy group may become interpenetrated with the PEI while being polymerized into a silicon polymer during the heating. Alternatively or additionally, the trialkoxysilane containing an epoxy group may be cross-linked with the PEI through a cross-linking reaction.

The heating temperature may be in the range of about 50 to about 120° C. When the heating temperature is less than about 50° C., the activation energy required for polymerization is may not be sufficiently supplied and the reaction rate may be slow. Additionally, methanol produced during the heating may not be properly removed, thereby lowering the reaction efficiency. When the heating temperature is higher than about 120° C., the physical properties of the resulting product may deteriorate.

The heating time may be in the range of about 4 to about 24 hours. The heating time may be determined according to the amount of the reactants and the type of silicon monomer used. When the heating time is less than about 4 hours, the polymer may not be sufficiently polymerized due to the short reaction time. When the heating time is longer than about 24 hours, the process may become economically disadvantageous.

It may be necessary to shape the polymer electrolyte membrane forming composition as a film before silicon monomers are polymerized by heating. The polymer electrolyte membrane forming composition may be shaped as a film by injecting the composition into a frame having a shape corresponding to the desired membrane. The shape and size of the frame may be determined in consideration of the type and capacity of the fuel cell to be produced. Alternatively, the composition may be shaped as a film by casting, by directly coating the composition onto an electrode, or the like.

The polymer electrolyte membrane forming composition may be shaped as a film and then may be heated, for example, at a temperature of about 50 to about 120° C., as described above. A silicon polymer is formed by the polymerization of the trialkoxysilane containing an epoxy group, and the silicon polymer is interpenetrated with the PEI. Alternatively or additionally, the trialkoxysilane containing an epoxy group may be directly cross-linked with the PEI. The heteropolyacid, the HTFSI, and/or the mesoporous material with a cation exchanging group may be distributed in the interpenetrated and/or cross-linked polymer structure.

The polymer electrode membrane forming composition may be used to form a polymer electrode membrane that may be used in a fuel cell including a cathode, an anode, and a polymer electrolyte membrane interposed between the cathode and anode.

The present invention will be described in greater detail with reference to the following examples. The following examples are for illustrative purposes only and are not intended to limit the scope of the present invention.

The ionic conductivity σ was measured in the following examples and comparative examples as follows. Both surfaces of each of the polymer electrolyte membranes manufactured in the following examples were coated with a fuel cell grade Pt catalyst, available from E-TEK Inc., by hot pressing at 85° C. and 300 psig. The resulting unit cell was cut to a size of 5 cm$^2$. The temperature and humidity were controlled using a Fuel Cell Testing Station available from Fuel Cell Technologies Inc. The proton conductivity was measured using a VoltaLab PGZ301 (Radiometer Analytical S.A.), which can be controlled by a personal computer, using an AC impedance method at 10 mV and a frequency of 0.1 to 100 kHz.

The resistance R of each of the membranes was determined using a minimum imaginary response point of the Nyquist curve, and the proton conductivity σ was calculated by dividing the thickness of the film by R.

EXAMPLE 1

(1) Preparation of PEI

A linear PEI was prepared as follows. 10 g of a linear poly(2-ethyl-2-oxazoline) available from Aldrich (molecular weight (MW)=500,000) and 250 ml of 7M HCl solution were put into a flask and heated for 5 days under reflux. The resultant was cooled to room temperature and 250 ml of 7.4M NaOH solution was added thereto to obtain a precipitate. The resulting precipitate was filtered and washed with deionized water until it was neutralized. Re-precipitation was performed in a mixture of ethanol and water with a volume ratio of 5:6. The re-precipitated product was dried at 90° C. and 0.1 mmHg to obtain PEI with a MW of 215,000 (yield: 90%). NMR (methanol-d$_4$): $^1$H: δ 2.73 (s, 4H), 4.84 (s, 1H). $^{13}$C: δ 48.45 (s).

(2) Preparation of Polymer Electrolyte Membrane Forming Composition 5.00 g of the PEI was dissolved in 45.0 g of ethanol to obtain 50.0 g of a solution. Then, 2.00 g of 3-glycidyloxypropyltrimethoxysilane was added to the solution and mixed at room temperature for 30 minutes. 2.46 g of mesoporous tungstosilica, 1.23 g of HTFSI, 1.23 g of H$_4$SiW$_{12}$O$_{40}$, and 0.37 g of H$_2$SO$_4$ as an acid catalyst were added thereto and mixed for 2 hours to obtain a polymer electrolyte membrane forming composition.

(3) Manufacture of Polymer Electrolyte Membrane

The polymer electrolyte membrane forming composition was left at room temperature for one day, injected to a frame having a shape corresponding to a polymer electrolyte membrane, and reacted at 80° C. for 8 hours to form a polymer electrolyte membrane.

The proton conductivity a of the polymer electrolyte membrane was measured at 130° C. and a relative humidity of 20%.

EXAMPLE 2

A polymer electrolyte membrane was manufactured in the same manner as in Example 1, except that 1.23 g of mesoporous tungstosilica was used to prepare the polymer electrolyte membrane forming composition, and the polymer electrolyte membrane forming composition was reacted at 50° C. for 12 hours to obtain the polymer electrolyte membrane.

EXAMPLE 3

A polymer electrolyte membrane was manufactured in the same manner as in Example 1, except that the polymer electrolyte membrane forming composition was reacted at 100° C. for 8 hours to obtain the polymer electrolyte membrane.

EXAMPLE 4

A polymer electrolyte membrane was manufactured in the same manner as in Example 1, except that no mesoporous tungstosilica was used to prepare the polymer electrolyte membrane forming composition, and the polymer electrolyte membrane forming composition was reacted at 100° C. for 8 hours to obtain the polymer electrolyte membrane.

COMPARATIVE EXAMPLE 1

A polymer electrolyte membrane was manufactured using NAFION 117 according to a conventional method.

TABLE 1

|  | Temperature (° C.) | Relative Humidity (%) | σ (S/cm) |
|---|---|---|---|
| Example 1 | 130 | 20 | $0.9 \times 10^{-2}$ |
| Example 2 | 130 | 20 | $1.2 \times 10^{-2}$ |
| Example 3 | 130 | 20 | $1.5 \times 10^{-2}$ |
| Example 4 | 130 | 20 | $1.1 \times 10^{-2}$ |
| Comparative Example 1 | 130 | 20 | $0.8 \times 10^{-2}$ |

As shown in Table 1, the polymer electrolyte membrane of Example 1 in which mesoporous tungstosilica, heteropolyacid, and trifluoromethanesulfoneimide were used had a greater ionic conductivity than the polymer electrolyte membrane formed using NAFION 117, and had a much greater ionic conductivity after annealing.

EXAMPLE 5

A methanol crossover test and a water crossover test were performed on the polymer electrolyte membrane of Example 1. The tests were performed using a Fuel Cell Testing Station, available from Fuel Cell Technology Inc., an 80/100 PORA-PAK P column, and a thermal conductivity measuring apparatus.

A 2M methanol solution was purged at an anode at a flow rate of 0.33 cm$^3$/minutes, a nitrogen gas was purged at a cathode, and the temperature of a cell was 50° C. The PORA-PAK P column was calibrated using a diluted methanol solution to measure methanol crossover and was calibrated using nitrogen gas, which was humidified at a different temperature, to measure water crossover.

The effective area of the electrode was 5.5 cm$^2$, and the flow rate of the nitrogen gas used as a carrier was 500 cc/minute.

EXAMPLE 6

Methanol crossover and water crossover were measured in the same manner as in Example 5, except that the flow rate of the nitrogen gas was 250 cc/minute.

COMPARATIVE EXAMPLE 2

Methanol crossover and water crossover were measured using the polymer electrolyte membrane of Comparative Example 1 in the same manner as in Example 5, except that the effective area of the electrode was 5.29 cm$^2$.

COMPARATIVE EXAMPLE 3

Methanol crossover and water crossover were measured in the same manner as in Comparative Example 2, except that the flow rate of the nitrogen gas was 250 cc/minute.

The results of the methanol crossover and water crossover measurements on Example 5, Example 6, Comparative Example 2, and Comparative Example 3 are shown in Table 2.

TABLE 2

|  | Effective Area (cm$^2$) | Nitrogen gas (cm$^3$/min) | Water (μmol/ (sec · cm$^2$)) | Methanol (μmol/ (sec · cm$^2$)) |
|---|---|---|---|---|
| Example 5 | 5.5 | 500 | 0.530 | 0.0304 |
| Example 6 | 5.5 | 250 | 0.523 | 0.0261 |
| Comparative Example 2 | 5.29 | 500 | 3.13 | 0.289 |
| Comparative Example 3 | 5.29 | 250 | 2.15 | 0.234 |

As shown in Table 2, the water crossover in the polymer electrolyte membranes of Example 5 and Example 6 was 70 to 80% smaller than in the polymer electrolyte membranes of Comparative Example 2 and Comparative Example 3. The methanol crossover in the polymer electrolyte membranes of Example 5 and Example 6 was 85 to 95% smaller than in the polymer electrolyte membranes of Comparative Example 2 and Comparative Example 3.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A polymer electrolyte, comprising:
   a product of the polymerization of a polymer electrolyte forming composition,
   wherein the polymer electrolyte forming composition comprises:
   a trialkoxysilane containing an epoxy group;
   polyethyleneimine; and
   at least one of heteropolyacid and trifluoromethanesulfoneimide.

2. The polymer electrolyte of claim 1,
   wherein the product of the polymerization of a polymer electrolyte forming composition comprises:
   at least one of a compound selected from:
   a mixture of a silicon polymer, which is obtained through the hydrolysis condensation polymerization reaction of trialkoxysilane-containing an epoxy group, and polyethyleneimine, and
   a product of a cross-linking reaction of trialkoxysilane containing an epoxy group and polyethyleneimine; and
   at least one of heteropolyacid and trifluoromethanesulfoneimide.

3. The polymer electrolyte of claim 1,
   wherein the product of the polymerization of a polymer electrolyte forming composition comprises a silicon polymer, which is obtained through the hydrolysis condensation polymerization reaction of the trialkoxysilane containing an epoxy group, and
wherein the silicon polymer and the polyethyleneimine are interpenetrated.

4. The polymer electrolyte of claim 1,
wherein the polymer electrolyte forming composition comprises:
about 3 to about 25 parts by weight per 100 parts by weight of the polymer electrolyte forming composition of the trialkoxysilane containing an epoxy group;
about 60 to about 75 parts by weight per 100 parts by weight of the polymer electrolyte forming composition of polyethyleneimine; and
about 3 to about 25 parts by weight per 100 parts by weight of the polymer electrolyte forming composition of at least one of heteropolyacid and trifluoromethanesulfoneimide.

5. The polymer electrolyte of claim 1,
wherein the polymer electrolyte forming composition further comprises a mesoporous material with a cation exchanging group.

6. The polymer electrolyte of claim 5,
wherein the total amount of the at least one of heteropolyacid and trifluorosulfoneimide and the mesoporous material with a cation exchanging group in the polymer electrolyte forming composition is about 3 to about 25 parts by weight per 100 parts by weight of the polymer electrolyte forming composition.

7. The polymer electrolyte of claim 1,
wherein the total amount of the at least one of heteropolyacid and trifluorosulfoneimide in the polymer electrolyte forming composition is about 3 to about 25 parts by weight per 100 parts by weight of the polymer electrolyte forming composition.

8. The polymer electrolyte of claim 1,
wherein the trialkoxysilane containing an epoxy group is 3-glycidyloxypropyltrimethoxysilane.

9. The polymer electrolyte of claim 1,
wherein the heteropolyacid is at least one of $H_4SiW_{12}O_{40}$, $H_4SiMo_{12}O_{40}$, $H_5SiVMo_{11}O_{40}$, $H_6SiV_2Mo_{10}O_{40}$, $H_7SiV_3Mo_9O_{40}$, $H_3PMo_{12}O_{40}$, $H_3PW_{12}O_{40}$, $(VO)_{1.5}PMo_{12}O_{40}$, $(VO)_{1.5}PW_{12}O_{40}$, $(TiO)_{1.5}PMo_{12}O_{40}$, $H(VO)PMo_{12}O_{40}$, $H(VO)PW_{12}O_{40}$, $H_6PV_3Mo_9O_{40}$, $H_5PV_2Mo_{10}O_{40}$, $H_5PV_2W_{10}O_{40}$, $H_6PV_3W_9O_{40}$, $H_4PV_2Mo_{11}O_{40}$, $H_4PVW_{11}O_{40}$, $RhPMo_{12}O_{40}$, $BiPMo_{12}O_{40}$, $HCrPVMo_{11}O_{40}$, and $HBiPVMo_{11}O_{40}$.

10. The polymer electrolyte of claim 1,
wherein the mesoporous material with a cation exchanging group is at least one of sulfonated silica, carboxylated silica, sulfonated tungstosilica, carboxylated tungstosilica, phosphonated silica, and phosphonated tungstosilica.

11. A method of manufacturing a polymer electrolyte comprising:
preparing a polymer electrolyte forming composition by mixing polyethyleneimine, a trialkoxysilane containing an epoxy group, and at least one of heteropolyacid and trifluorosulfoneimide; and
polymerizing the polymer electrolyte forming composition by heating.

12. The method of claim 11, further comprising:
adding a mesoporous material with a cation exchanging group to the polymer electrolyte forming composition.

13. The method of claim 12,
wherein the total amount of the at least one of heteropolyacid and trifluorosulfoneimide and the mesoporous material with a cation exchanging group is about 2 to about 22 parts by weight based on 100 parts by weight of the polymer electrolyte forming composition.

14. The method of claim 11,
wherein the amount of the at least one of heteropolyacid and trifluorosulfoneimide is about 2 to about 22 parts by weight based on 100 parts by weight of the polymer electrolyte forming composition.

15. The method of claim 11, further comprising:
adding an acid catalyst to the polymer electrolyte forming composition.

16. The method of claim 15,
wherein the acid catalyst is at least one of a nitric acid, a hydrochloric acid, a sulfuric acid, a phosphoric acid, an acetic acid, an organic sulfonic acid, hydrofluoric acid, and $CF_3SO_3H$.

17. The method of claim 11,
wherein the heating is performed at a temperature of about 50 to about 120° C. for about 4 to about 24 hours.

18. A fuel cell comprising:
a cathode;
an anode; and
a polymer electrolyte membrane interposed between the cathode and the anode,
wherein the polymer electrolyte membrane comprises:
a product of the polymerization of a polymer electrolyte forming composition,
wherein the polymer electrolyte forming composition comprises:
a trialkoxysilane containing an epoxy group;
polyethyleneimine; and
at least one of heteropolyacid and trifluoromethanesulfoneimide.

19. The fuel cell of claim 18,
wherein the product of the polymerization of a fuel cell forming composition comprises:
at least one of a compound selected from:
a mixture of a silicon polymer, which is obtained through the hydrolysis condensation polymerization reaction of trialkoxysilane containing an epoxy group, and polyethyleneimine, and
a product of a cross-linking reaction of trialkoxysilane containing an epoxy group and polyethyleneimine; and
at least one of heteropolyacid and trifluoromethanesulfoneimide.

20. The fuel cell of claim 18,
wherein the product of the polymerization of a fuel cell forming composition comprises a silicon polymer, which is obtained through the hydrolysis condensation polymerization reaction of the trialkoxysilane containing an epoxy group, and
wherein the silicon polymer and the polyethyleneimine are interpenetrated.

21. The fuel cell of claim 18,
wherein the fuel cell forming composition comprises:
about 3 to about 25 parts by weight per 100 parts by weight of the fuel cell forming composition of the trialkoxysilane containing an epoxy group;
about 60 to about 75 parts by weight per 100 parts by weight of the fuel cell forming composition of polyethyleneimine; and
about 3 to about 25 parts by weight per 100 parts by weight of the fuel cell forming composition of at least one of heteropolyacid and trifluoromethanesulfoneimide.

22. The fuel cell of claim 18,
wherein the fuel cell forming composition further comprises a mesoporous material with a cation exchanging group.

23. The fuel cell of claim 22,
wherein the total amount of the at least one of heteropolyacid and trifluorosulfoneimide and the mesoporous material with a cation exchanging group in the fuel cell forming composition is about 3 to about 25 parts by weight per 100 parts by weight of the fuel cell forming composition.

24. The fuel cell of claim 18,
wherein the total amount of the at least one of heteropolyacid and trifluorosulfoneimide in the fuel cell forming composition is about 3 to about 25 parts by weight per 100 parts by weight of the fuel cell forming composition.

25. The fuel cell of claim 18,
wherein the trialkoxysilane containing an epoxy group is 3-glycidyloxypropyltrimethoxysilane.

26. The fuel cell of claim 18,
wherein the heteropolyacid is at least one of $H_4SiW_{12}O_{40}$, $H_4SiMo_{12}O_{40}$, $H_5SiVMo_{11}O_{40}$, $H_6SiV_2Mo_{10}O_{40}$, $H_7SiV_3Mo_9O_{40}$, $H_3PMo_{12}O_{40}$, $H_3PW_{12}O_{40}$, $(VO)_{1.5}PM_{12}O_{40}$, $(VO)_{1.5}PW_{12}O_{40}$, $(TiO)_{1.5}PMo_{12}O_{40}$, $H(VO)PMo_2O_{40}$, $H(VO)PW_{12}O_{40}$, $H_6PV_3Mo_9O_{40}$, $H_5PV_2Mo_{10}O_{40}$, $H_5PV_2W_{10}O_{40}$, $H_6PV_3W_9O_{40}$, $H_4PV_2Mo_{11}O_{40}$, $H_4PVW_{11}O_{40}$, $RhPMo_{12}O_{40}$, $BiPMo_{12}O_{40}$, $HCrPVMo_{11}O_{40}$, and $HBiPVMo_{11}O_{40}$.

27. The fuel cell of claim 18,
wherein the mesoporous material with a cation exchanging group is at least one of sulfonated silica, carboxylated silica, sulfonated tungstosilica, carboxylated tungstosilica, phosphonated silica, and phosphonated tungstosilica.

* * * * *

UNITED STATES PATENT AND TRADEMARK OFFICE
CERTIFICATE OF CORRECTION

PATENT NO. : 7,622,220 B2  Page 1 of 1
APPLICATION NO. : 11/332266
DATED : November 24, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 832 days.

Signed and Sealed this

Fourteenth Day of December, 2010

David J. Kappos
*Director of the United States Patent and Trademark Office*